Sept. 17, 1968 W. J. MILLON 3,402,360

FAST RECOVERY AGC

Filed Oct. 3, 1966 2 Sheets-Sheet 1

INVENTOR
WILLIAM J. MILLON

BY
Mueller Aichele & Rauner
ATTYS.

FAST RECOVERY AGC

Filed Oct. 5, 1966 2 Sheets-Sheet 2

INVENTOR
WILLIAM J. MILLON
BY
Mueller, Aichele & Rauner
ATTYS.

United States Patent Office 3,402,360
Patented Sept. 17, 1968

3,402,360
FAST RECOVERY AGC

William J. Millon, Park Ridge, Ill., assignor to Motorola, Inc., Franklin Park, Ill., a corporation of Illinois Filed Oct. 3, 1966, Ser. No. 583,603
6 Claims. (Cl. 330—29)

This invention relates to automatic gain control systems and in particular to a fast recovery automatic gain control circuit for pulsed signaling systems.

Automatic gain control circuits are commonly used in electronic systems to regulate the amplitudes of signals so that the electronics systems can use signals having widely varying amplitudes. In systems where signals of different amplitudes are received in sequence the automatic gain control circuits may not be able to recover rapidly enough to respond to a weak signal received immediately after a strong signal. This is particularly a problem when the automatic gain control circuit requires filtering circuits to prevent intermodulation distortion. These circuits store energy which must be dissipated before the automatic gain control circuit returns to its maximum gain condition. Thus the signals in the sequence must be spaced far enough apart to permit time for the automatic gain control circuit to recover to its full gain condition or weak signals may be attenuated to the degree that they are not usable in the system.

It is therefore, an object of this invention to provide an improved automatic gain control circuit wherein weak signals can be received immediately after reception of strong signals.

Another object of this invention is to provide an automatic gain control circuit including a fast recovery circuit to restore the amplifier circuit to its maximum gain condition rapidly.

A feature of this invention is provision of an automatic gain control circuit including a fast recovery circuit which senses the end of the automatic gain control circuit regulating action and acts, through a regenerative circuit, to dissipate the stored energy in the automatic gain control circuit.

The invention is illustrated in the drawings of which;

In practicing this invention an automatic gain control circuit is provided for regulating the amplitude of received signals in response to a control signal applied thereto. The output signal from the automatic gain control signal amplifier is rectified and filtered to become the control signal. The filter stores energy which must be dissipated before the automatic gain control circuit can return to its full gain condition after removal of the control signal.

A fast recovery circuit is added which senses the end of the control signal and acts through a regenerative circuit coupled to the automatic gain control circuit, to produce a voltage having a polarity opposite to that of the control signal to discharge the energy stored in the filter of the automatic gain control circuit.

Figure 1:
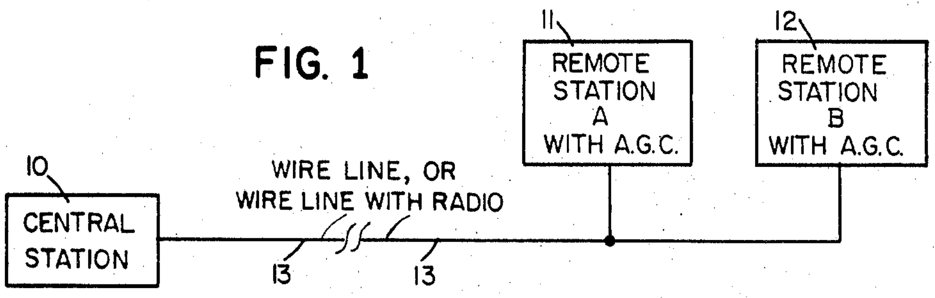
FIG. 1 is a block diagram illustrating a system requiring fast recovery automatic gain control.

Referring to FIG. 1 there is shown a system which incorporates the fast recovery automatic gain control circuit of this invention. A central station 10 interrogates a plurality of remote stations represented by station 11 and station 12. Stations 11 and 12 are coupled to central station 10 over a line 13 which may be a single wire line or a radio link combined with a wire line, and thus signals transmitted by any station will be received by every other station connected to the line. In a typical system of this type central station 10 may be many miles from station 11 with station 12 being only a fraction of a mile from station 11. Thus the signals received by the various stations will vary widely in signal strength.

Figure 2:
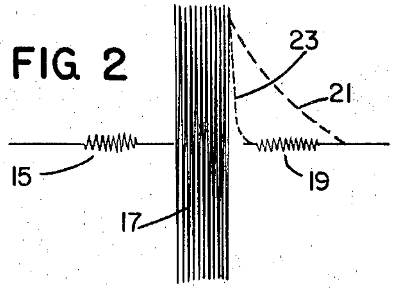
FIG. 2 is a drawing of the waveforms of received signals in the system of FIG. 1 showing the gain recovery of automatic gain control circuits.

Referring to FIG. 2 there is shown an example of the signals received by the stations. Assume central station 10 interrogates station 12. The signal received by both stations 11 and 12 is represented by signal 15. It can be seen that this signal is very weak and therefore, the gain of the automatic gain control circuit of station 11 will be set for maximum amplifier gain. Station 12 replies to the interrogation from central station 10 and the signal strength of this reply, as received by station 11, is very high as shown in waveform 17 of FIG. 2. This automatic gain control circuit of station 11 acts to attenuate the signal represented by waveform 17. Because of the energy stored in the automatic gain control circuit when the gain is reduced, an appreciable amount of time is required for the amplifier to recover to its maximum gain condition. For circuits not having the fast recovery feature, this time period is illustrated by curve 21. A signal from central station 10, waveform 19, received by remote station 11, during the recovery period of the automatic gain control circuit, will be from the preceding signal and will be suppressed by stored energy too weak to actuate station 11. In order to prevent this, a fast recovery circuit is incorporated with the automatic gain control to cause this circuit to be restored to its maximum gain condition more rapidly, as shown by curve 23. Thus, when waveform 19 is received, the automatic gain control circuit of station 11 is in its maximum gain condition.

Figure 3:
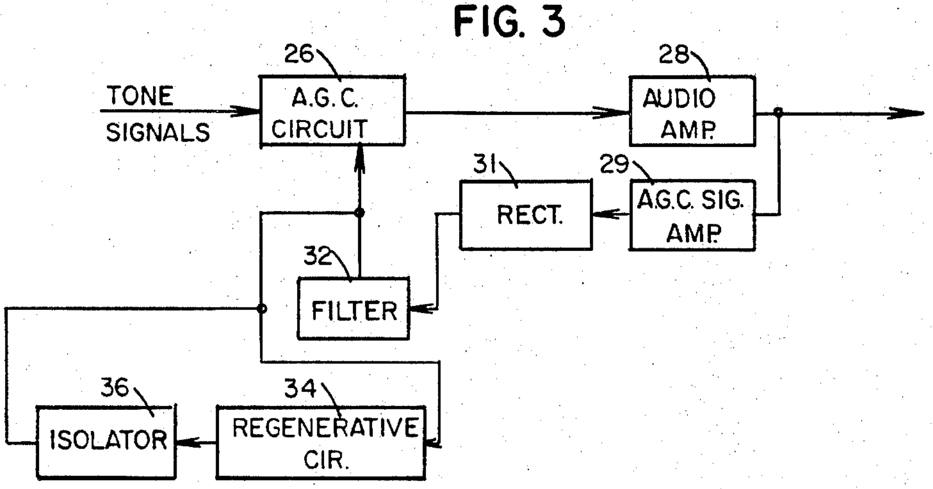
FIG. 3 is a block diagram of the fast recovery automatic gain control circuit of this invention.

Referirng to FIG. 3 there is shown a block diagram of the automatic gain control and fast recovery circuits of this invention. Input signals are received by automatic gain control circuit 26 where their amplitude is regulated in accordance with a control signal from rectifier 31 and filter 32. The gain regulated output signal from automatic gain control circuit 26 is coupled to audio amplifier 28 where it is amplified. The output of audio amplifier 28 is coupled to other circuits as desired and also to automatic gain control signal amplifier 29. The output signal from amplifier 29 is coupled to rectifier 31 where it is rectified. It is then filtered in filter 32 to develop the control signal which is coupled to automatic gain control circuit 26. The control signal developed by rectifier 31 and filter 32 acts to regulate the attenuation of automatic gain control circuit 26 in accordance with the signal strength of the input signal.

The input signals may be coded by having a plurality of separate tone frequencies to identify the addressee and the action desired at the address. These tone frequencies are present on the rectified signal from rectifier 31 and would cause intermodulation when the control signal is applied to the automatic gain control circuit. To prevent intermodulation of the input signal by the control signal heavy filtering is required. Accordingly filter 32 is coupled to the output rectifier 31 to reduce the amplitude of the tone frequencies which may be present on the control signal to a negligible value.

At the end of a received tone signal it is desired that the attenuation of automatic gain control circuit 26 be restored to minimum value as soon as possible. When the tone signal ends the control signal from rectifier 31 also ends, however, the energy stored in filter 32 is still applied to automatic gain control circuit 26 and its attenuation will not reach its minimum value until the energy stored in filter 32 is dissipated.

A fast recovery circuit is included in the automatic gain control system of FIG. 3. The filtered output of rectifier 31, i.e. the automatic gain control signal is coupled to the input of regenerative circuit 34. Isolator 36 couples the output of regenerative circuit 34 back to filter 32 and automatic gain control circuit 26. Isolator 36 acts to prevent the control signal from being applied to the output of regenerative circuit 34 to cause a malfunction of the regenerative circuit.

In operation, a small reduction in the amplitude of the control signal from rectifier 31 and filter 32 is sensed by regenerative circuit 34 to produce a signal of a polarity opposite to that of the control signal. The signal of opposite polarity acts to dissipate the energy stored in filter 32 reducing the control signal more rapidly. This more rapid decrease in the control signal from rectifier 31 is coupled back to the input of regenerative circuit 34. In response to this further decrease in the control signal, regenerative circuit 34 produces a larger output signal of opposite polarity which reduces the automatic gain control signal still further. This regenerative action results in a rapid switching to produce a large signal of a polarity opposite to that of the control signal to dissipate the energy stored in filter 32 and to permit automatic gain control circuit 26 to be restored to its minimum attenuation condition.

Figure 4:
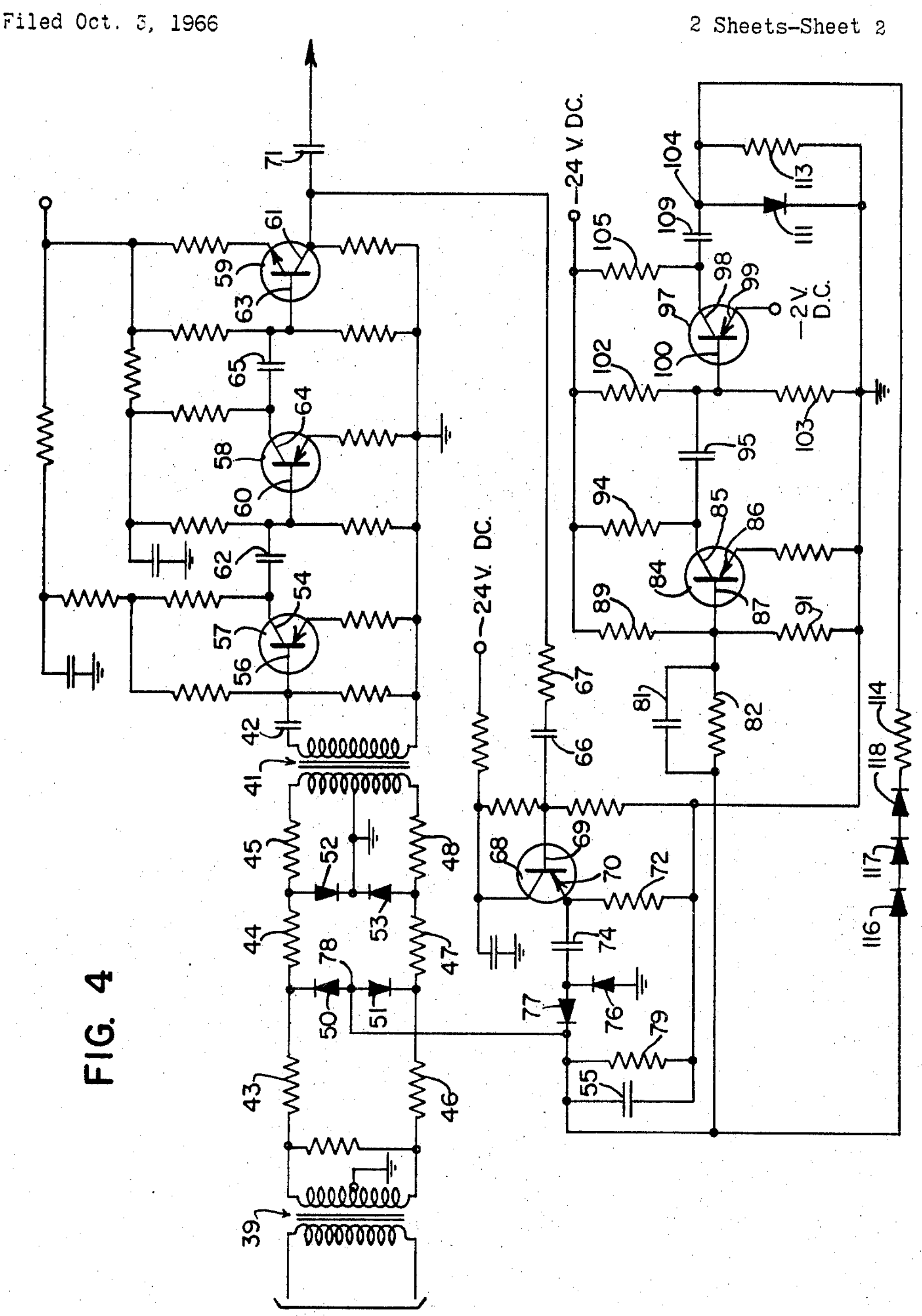
FIG. 4 is a schematic of the circuit shown in block diagram form in FIG. 3.

In FIG. 4 there is shown a schematic of an automatic gain control circuit incorporating the fast recovery circuit of this invention. Input signals are received by transformer 39 and coupled to transformer 41 through resistors 43 to 48. The output of transformer 41 is coupled by capacitor 42 to base 56 of transistor 57 where it is amplified. The output of transistor 57 is coupled from collector 54 to base 60 of transformer 58 through capacitor 62. Transistor 58 further amplifies the input signals and the amplified signals are coupled from collector 64 to base 63 of transistor 59 through capacitor 65. Transistor 59 further amplifies the input tone signals and they are coupled to other circuits by capacitor 71.

The signals appearing at collector 61 of transistor 59 are also coupled to emitter follower transistor 68 by resistor 67 and capacitor 66. The output signal from transistor 68 appears across emitter resistor 72 and is coupled to the rectifier circuit consisting of diodes 76 and 77, through capacitor 74. The rectified signal appearing across resistor 79 is filtered by capacitor 55. This voltage comprises the automatic gain control signal for the circuit. With rectifiers 76 and 77 poled as shown in FIG. 4 the control signal has a positive polarity. The positive control signal is applied to diodes 50 to 53 in the automatic gain control circuit, biasing the diodes in the forward direction, with the resistance of the diodes being determined by the amplitude of the control signal. These diodes act to attenuate the input signal. The amount of attenuation is proportional to the amplitude of the control signal which is proportional to the amplitude of the input signals.

A large filter capacitor 55 is coupled from junction 78 to ground to filter the control signal and to prevent any intermodulation between the control signal and the input signals. During the time that the control signal is applied to the automatic gain control circuit capacitor 55 charges providing the control signal. When the input signals end the automatic gain control signal from transistor amplifier 68 is no longer present. However, the potential stored in capacitor 55 must be discharged before the effective gain of the amplifier circuit is restored to its maximum value. Without the fast recovery circuit the time constant of the discharge path is very high and thus it will take a relatively large amount of time for the potential on capacitor 55 to be reduced to a point where diodes 50 to 53 are biased to non-conduction.

In order to decrease the recovery time of the filter and thus the automatic gain control circuit, a fast recovery circuit is added. The control signal is coupled to base 87 of transistor 84 through a coupling circuit consisting of resistor 82 and capacitor 81. Collector 85 of transistor 84 is coupled to base 100 of transistor 97 through capacitor 95. Collector 98 of transistor 97 is coupled back to junction point 78 through capacitor 109 and an isolation network consisting of resistor 114 and diodes 116 to 118. Resistors 89 and 91 bias base 87 of transistor 84 and resistors 102 and 103 bias base 100 of transistor 97.

In normal operation with a positive control signal applied to junction 78 and base 87, transistor 84 is biased to a point in the linear region while transistor 97 is biased to saturation. The voltage appearing on collector 98 is a small minus voltage in the standby state. Diodes 111 and 116 to 118 together with resistor 114 and resistor 113 act to maintain the voltage at junction point 104 slightly positive. Therefore, the voltage across capacitor 109 is a very small voltage.

With a reduction in the amplitude of the control signal the conduction of transistor 84 increases. This increase in the conduction of transistor 84 results in an increase in the voltage appearing on collector 85 which is coupled to base 100 of transistor 97. Increasing the voltage applied to base 100 reduces the conduction of transistor 97 causing a reduction of the potential on collector 98 and also a reduction of potential at junction point 104. This reduction in the potential at junction point 104 provides a discharge signal which is coupled back to junction point 78 and base 87 of transistor 84 through the diodes 116 to 118 and resistor 114. The discharge signal acts to reduce the potential stored in capacitor 55 more rapidly and also acts to further increase the conduction of transistor 84 and decrease the conduction of transistor 97. This regenerative action continues until transistor 97 is switched to non-conduction reducing the potential of the discharge signal at junction point 104 to a large negative value. This negative potential is applied to capacitor 55 to discharge the positive potential stored therein. Then the regenerative action of the fast recovery circuit acts to discharge rapidly the control signal potential stored in capacitor 55 to restore the automatic gain control circuit to its maximum gain condition. Diodes 116 to 118 provide a voltage bias so that the discharge signal at junction point 104 must exceed a predetermined value before the regenerative action can take place.

Examples of the values of components which may be used in a circuit such as shown in FIG. 4 are as follows. However, the circuit components are not limited to these values.

| | | |
|---|---|---|
| Resistors 43, 46 | ohms | 4.7K |
| Resistors 44, 47 | do | 1K |
| Resistors 45, 48 | do | 2.2K |
| Resistor 72 | do | 56 |
| Resistor 79 | do | 10K |
| Resistor 113 | do | 1.5K |
| Resistor 114 | do | 6.8K |
| Capacitor 55 | mfd | 56 |
| Capacitor 74 | mfd | 100 |
| Capacitor 109 | mfd | 3 |

I claim:

1. A fast recovery circuit for an automatic gain control circuit including signal amplitude regulating means adapted to receive input signals and to regulate the amplitude thereof in response to a control signal applied thereto, and rectifier means coupled to the output of the automatic gain control circuit for receiving the amplitude regulated input signals and to develop a control signal having a trailing edge in response thereto, said fast recovery circuit including in combination, filter means coupling the rectifier means to the signal amplitude regulating means for filtering the control signal and applying the same to the signal amplitude regulation means, said filter means being responsive to the control signal to store a potential therein, regenerative circuit means having an input circuit coupled to the filter means for receiving the control signal and an output circuit, circuit means coupling said output circuit of said regenerative circuit means to said input circuit of said regenerative circuit means and said filter means, said regenerative circuit means being responsive to the trailing edge of the control signal to develop a discharge signal at said output circuit of said regenerative circuit means, said filter means being responsive to said discharge signal whereby said stored potential is rapidly reduced.

2. The fast recovery circuit of claim 1, wherein said circuit means includes isolation means coupling said output circuit of said regenerative circuit means to said input circuit of said regenerative circuit means and said filter means, said isolation means acting to decouple said output of said regenerative circuit means from said input of said regenerative circuit means whereby a discharge signal of a predetermined amplitude is required to cause regenerative action of said regenerative circuit means.

3. The fast recovery circuit of claim 2, wherein said filter means includes first capacitance means coupled between the signal amplitude regulating means, the rectifier means and said circuit means and a reference potential.

4. The fast recovery circuit of claim 3, wherein said isolation means includes first diode means and first resistance means series coupled between said output circuit of said regenerative circuit means and said input circuit of said regenerative circuit means, said first diode means acting to establish a threshold voltage whereby a discharge signal of a predetermined amplitude is required to cause regenerative action of said regenerative circuit means.

5. The fast recoverey circuit of claim 4, wherein said output circuit of said regenerative circuit means includes second capacitance means for receiving said discharge signal and second diode means coupled between said second capacitance means and a reference potential for clamping said discharge signal at a predetermined voltage level.

6. The fast recovery circuit of claim 5, wherein the trailing edge of the control signal changes amplitude in a particular direction, said regenerative circuit means includes a first transistor and a second transistor capacitively coupled to said first transistor, said input circuit of said regenerative circuit means including second resistance means and third capacitance means coupled in parallel from said filter means to said first transistor, said second capacitance means being coupled to said second transistor means, said first transistor being responsive to the trailing edge of the control signal to develop a pulse signal at the output of said first transistor, the amplitude of said pulse signal changing in a direction opposite to said particular direction, said second transistor being biased to conduction and being responsive to said pulse signal whereby the conduction thereof is reduced to develop an output signal at said second capacitance means, the amplitude of said output signal changing in said particular direction, said circuit means acting to couple said output signal to said third capacitance means and said second resistance means to cause said regenerative action of said regenerative circuit means whereby said discharge signal is developed.

References Cited

UNITED STATES PATENTS 3,230,458 1/1966 Stangeland --------- 325—410

ROY LAKE, *Primary Examiner.*

JAMES B. MULLINS, *Assistant Examiner.*